United States Patent [19]

Haydocy et al.

[11] Patent Number: 5,645,513

[45] Date of Patent: Jul. 8, 1997

[54] EXERCISING APPARATUS WHICH INTERACTS WITH A VIDEO GAME APPARATUS DURING EXERCISE

[75] Inventors: Christopher J. Haydocy, Dublin; H. Dwight Eberhart, Powell; Robert J. Caruso, Hilliard, all of Ohio

[73] Assignee: Computer Athlete, Inc., Dublin, Ohio

[21] Appl. No.: 663,590

[22] Filed: Jun. 14, 1996

Related U.S. Application Data

[63] Continuation of Ser. No. 467,105, Jun. 6, 1995, abandoned, which is a continuation of Ser. No. 195,981, Feb. 10, 1994, abandoned, which is a continuation of Ser. No. 970,341, Nov. 2, 1992, abandoned.

[51] Int. Cl.$^6$ ........................................... A63F 9/00
[52] U.S. Cl. ................... 482/57; 482/3; 482/7; 482/902
[58] Field of Search ................... 482/1–9, 51, 52, 482/54, 57, 72, 900–902; 434/247, 258

[56] References Cited

U.S. PATENT DOCUMENTS

| | | |
|---|---|---|
| 4,278,095 | 7/1981 | Lapeyre ........................................ 482/7 |
| 4,489,938 | 12/1984 | Darzinskis . |
| 4,512,567 | 4/1985 | Phillips . |
| 4,542,897 | 9/1985 | Melton et al. . |
| 4,588,187 | 5/1986 | Dell . |
| 4,630,817 | 12/1986 | Buckley . |
| 4,637,605 | 1/1987 | Ritchie . |
| 4,674,741 | 6/1987 | Pasierb, Jr. ................................. 482/72 |
| 4,720,789 | 1/1988 | Hector et al. . |
| 4,774,679 | 9/1988 | Carlin ................................. 482/902 X |
| 4,815,733 | 3/1989 | Yokoi . |
| 4,817,950 | 4/1989 | Goo . |
| 4,925,189 | 5/1990 | Braeunig . |
| 4,976,435 | 12/1990 | Shatford et al. . |
| 5,001,632 | 3/1991 | Hall-Tipping . |
| 5,059,958 | 10/1991 | Jacobs et al. . |
| 5,076,584 | 12/1991 | Openiano . |
| 5,120,228 | 6/1992 | Stahl et al. ................................. 434/258 |

*Primary Examiner*—Richard J. Apley
*Assistant Examiner*—Glenn E. Richman
*Attorney, Agent, or Firm*—John L. Gray

[57] ABSTRACT

An exercise apparatus combined with a video game computer that allows the exerciser to interactively participate in the video game whereby the exerciser's advancement in the video game depends on his rate of exercise and hand-eye coordination. The exercise apparatus provides entertainment and a positive mental distraction from the boring physical exercising experience by enabling multi-sensor feedback between the user and video game simulation. This exercise apparatus has the ability to interface with any exercise device that the user prefers and it will also work with non-equipment exercising methods.

7 Claims, 2 Drawing Sheets

EXERCISING APPARATUS WHICH INTERACTS WITH A VIDEO GAME APPARATUS DURING EXERCISE

This application is a continuation of U.S. patent application Ser. No. 08/467,105 abandoned, filed Jun. 6, 1995, U.S. patent application Ser. No. 08/467,105 is a continuation of U.S. patent application Ser. No. 08/195,981 filed Feb. 10, 1994 abandoned, and U.S. patent application Ser. No. 08/195,981 is a continuation of U.S. patent application Ser. No. 07/970,341 filed Nov. 2, 1992 abandoned.

BACKGROUND OF THE INVENTION

This invention relates to an exercise apparatus that can be used on a variety of exercise equipment or with non-equipment exercising methods, in conjunction with a personal computer or television video game.

The popularity of home video games and exercise equipment has grown immensely over the past five years and is expected to grow steadily over the next five years. Based on the proliferation of home video game equipment and home exercise equipment, a need has developed to create activities that combine both types of home activities. This invention creates added usefulness for two products that the exerciser may already have but may be under utilizing. In addition, it makes the beneficial activity of exercising more enjoyable and fruitful by providing entertaining and responsive feedback to the exerciser.

The concept of exercising while engaging in some type of interactive visual or peripheral activity is discussed in patent art and is shown in various devices.

For example, British Patent Application No. GB 2114901A, Bannister, filed on Feb. 9, 1983, shows the use of an exercise machine used with video and/or audio equipment and connected by a sensor unit in such a way that operation of the exercise machine affects the signal on the video screen. The sensor units use markers attached to the exercise machine to activate electromagnetic radiation detectors in order to determine the speed of the exercise machine. This invention is limited to use with an exercise machine and the use of attachable markers.

U.S. Pat. No. 4,489,938, Kazimir, et al., entitled "Video Computer System Controlled by Operation of Elastomeric Exercise Apparatus," issued Dec. 25, 1984. This patent shows an elastomeric physical exercise device and a video game combination, whereby the "fire" operation for the video game is only executed when the exerciser stretches the elastomer portion of the exercise device. The stretching elastomer is connected directly to the transducer assembly whereby the pulling action on the stretching means causes operation of the transducer switch mechanism for the "fire" function involved in the play of the video game. This invention is limited to exercise devices that have a stretching member.

U.S. Pat. No. 4,512,567, Phillips, entitled "Exercise Bicycle Apparatus Particularly Adapted for Controlling Video Games," issued Apr. 23, 1985. This patent shows an exercise bicycle that is used to control and fully operate a video game by use of electrical signals. These electrical signals are based on the motion of the handlebars as well as signals proportional to the speed at which the bicycle is being operated. This invention requires the use of an electrical generator and is limited to use with only exercise bicycles.

U.S. Pat. No. 4,542,897, Melton, entitled "Exercise Cycle With Interactive Amusement Device," issued Sep. 24, 1985. This patent shows an exercise bicycle combined with a video game computer and game control that allows the physical effort of the operator to generate electrical current for operation of the game control, thereby permitting the operator to control and interact with the computer only upon maintaining a predetermined level of physical effort.

U.S. Pat. No. 4,637,605, Ritchie, entitled "Controls for a Game Bike," issued Jan. 20, 1987. This invention relates to a video game control arrangement whereby player movement is controlled on a video screen from the handlebars of an exercise bicycle. The arrangement is set up such that the video controls can only be operated with a preset acceptable exercise pace, below which the video game controls are non-operational.

U.S. Pat. No 4,976,435, Shatford, et al. entitled "Video Game Control Adapter," issued Dec. 11, 1990. This invention discloses an adapter for use with an exercise machine for driving control inputs of a video game system, and providing a plurality of selectable functional relationships between a set of input signals and the control inputs. The input signal is responsive to movement of a continuously rotatable member of an exercise machine and inputs mounted thereon also. This invention is also limited to use with an exercise machine.

None of the prior art is concerned with the combination of an exercise apparatus with a video game computer and game control, where a specific piece of exercise equipment is not required to determine the physical effort of the operator in order to control and interact with the video game.

These benefits, together with other objects and advantages of the invention will become more readily apparent to those skilled in the art when the following general statements and descriptions are read in the light of the appended drawings.

SUMMARY OF THE INVENTION

The present invention is designed to provide entertainment and a positive mental distraction from the indoor physical exercising experience, by enabling multi-sensor feedback between the exerciser and a video game. The exerciser has the ability to interactively participate with a video game, proportional to the amount of physical effort expended while exercising. This invention has the unique ability of being able to interface with any existing exercise equipment, and it will work with non-equipment exercising methods also.

The person who is participating in indoor exercising, usually considers such programs (after a while) as boring and routine. This invention will enable the exerciser to play a video game by him/herself or against other exercisers. The other exercisers will also have to be using this invention and all of the inventions will have to be connected to each other. The capability of being able to use this invention by yourself or with others will reduce the routine and boring nature of indoor exercise.

The present invention creates an added usefulness for a personal computer, video game computers, and indoor exercise equipment. These types of products are found in a vast number of homes and are often under utilized.

The exercise apparatus consists of two primary parts. (1) hardware which includes a movement sensor and feedback sensors for the exerciser, and (2) computer software which provides visual feedback and entertainment (via a video game context) to the exerciser. The movement sensor currently used is an optical-interrupter circuit, but any other types of sensors such as magnetic induction detector, variable voltage generator, thermoresistor, or piezo-electric pressure-sensitive transducers could be used. The other inputs from the exerciser are gathered through hand-operated micro-switches mounted in a strap that can either be hand held or attached to the exercise equipment (e.g. handlebars). A standard analog input port on a computer is used to interface the sensors with the personal computer or to an input jack located on a video game computer. The computer software consists of a simulated journey of the exerciser through an environment of competitors, obstacles, and opportunities for advancement in a gaming metaphor which uses three-dimensional graphics, sound, and trade secret movement sensor algorithms.

This arrangement will encourage the exerciser to exert more physical effort and exercise longer during their indoor exercise routine, by keeping score, and allowing competition with other competitors displayed on the screen.

These, together with other objects and advantages of the invention will become more readily apparent to those skilled in the art when the following general statements and descriptions are read in the light of the appended drawings.

DETAILED DESCRIPTION OF THE INVENTION

Figure 2:
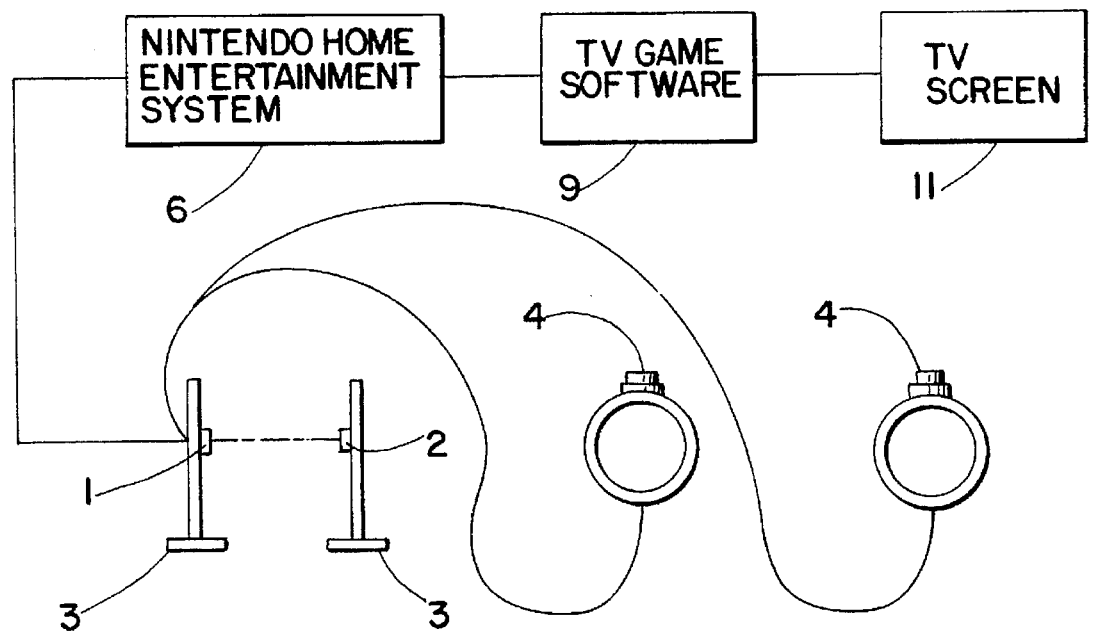
FIG. 2 is a perspective view of the hand-operated micro switches mounted in straps, along with the exercise apparatus sensor positioned on stands as it interfaces with a video game computer, such as Nintendo, and television game software. The effects are shown on the television screen.
Figure 1:
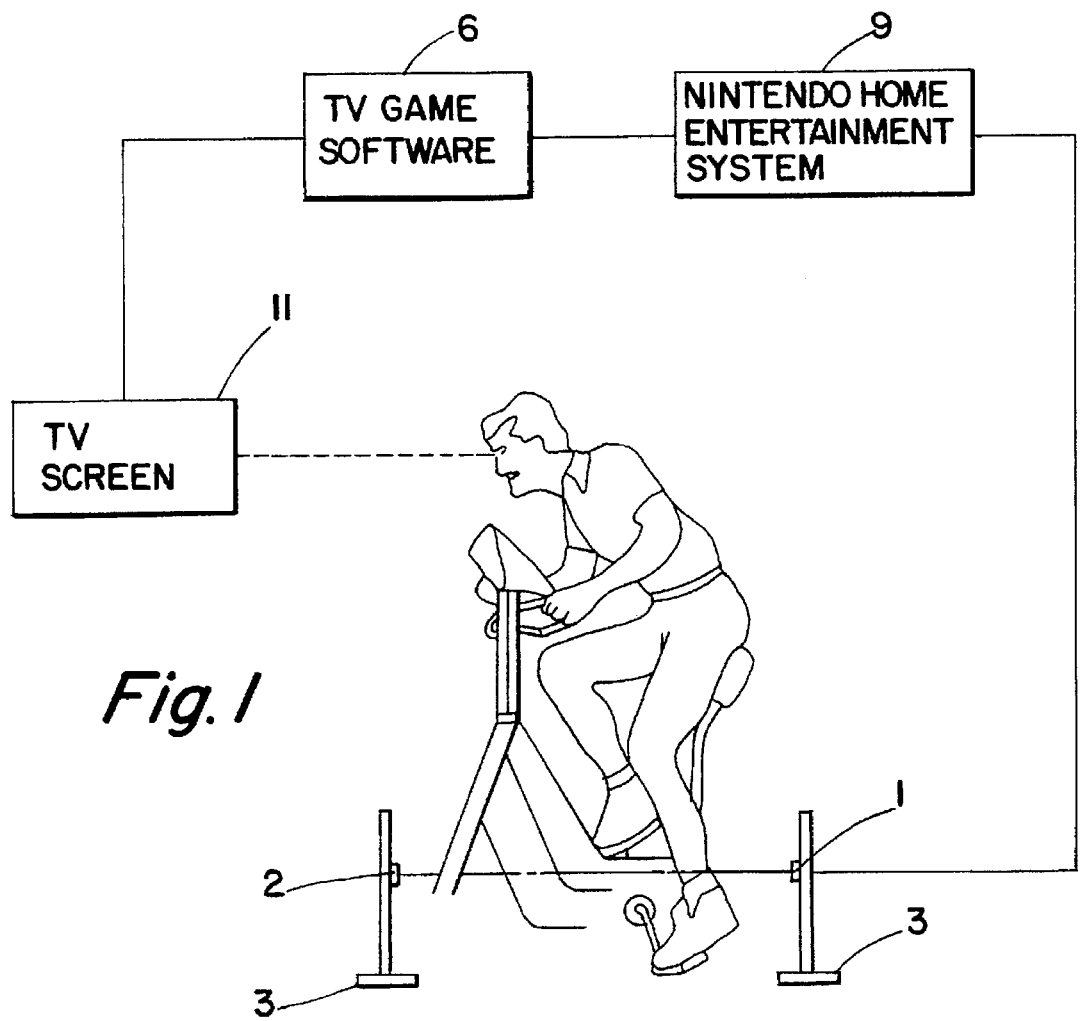
FIG. 1 is a perspective view of a combination of the exercise apparatus sensor positioned on stands used in connection with an exercise bicycle. The exercise apparatus is interfacing with a television video game (such as Nintendo) in order to interact with the exercise apparatus' television game software to control and move objects displayed on the television screen.

Referring to FIG. 1, there is shown the combination of the exercise apparatus being used with an exercise bicycle and a Nintendo video game computer. There are a variety of video game computers on the market, such as those manufactured by Atari, Sega, Apple, IBM, and this invention is not limited to use with only the Nintendo model, but will work with all models. In addition to the exercise bicycle shown in FIG. 1, this invention will operate with any indoor exercise devices (i.e. stair stepper, rower, treadmill, cross country skier, etc.).

This invention is designed to provide the exerciser with entertainment and a positive mental distraction from the normal indoor exercising routine. In FIG. 1 it is shown that an optical interrupter circuit 1 and a reflector 2 is being used to measure the amount of physical effort exerted by the exerciser. This amount of effort is measured by the number of times and frequency the exerciser breaks the optical beam. The optical interrupter circuit 1 and reflector 2 are attached to stands 3—3 which have adjustable positions for the optical interrupter circuit 1 and reflector 2.

Figure 4:
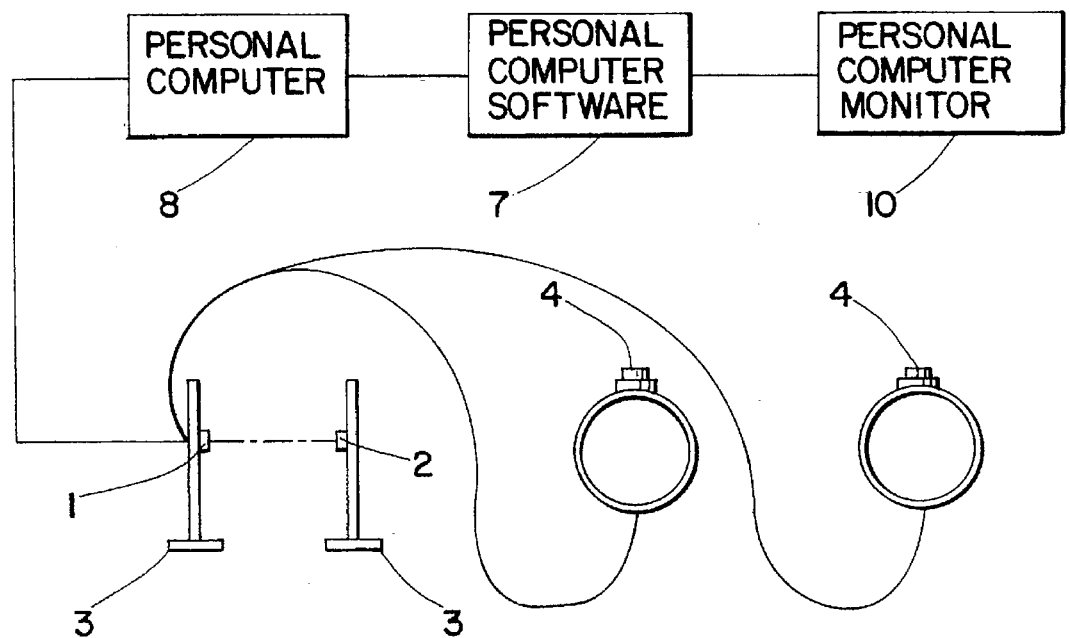
FIG. 4 is a perspective view of the hand operated micro switches mounted in straps, along with the exercise apparatus sensor positioned on stands as it interfaces with a personal computer in order to interact with the exercise apparatus' personal computer game software to control and move objects displayed on the personal computer screen.
Figure 3:
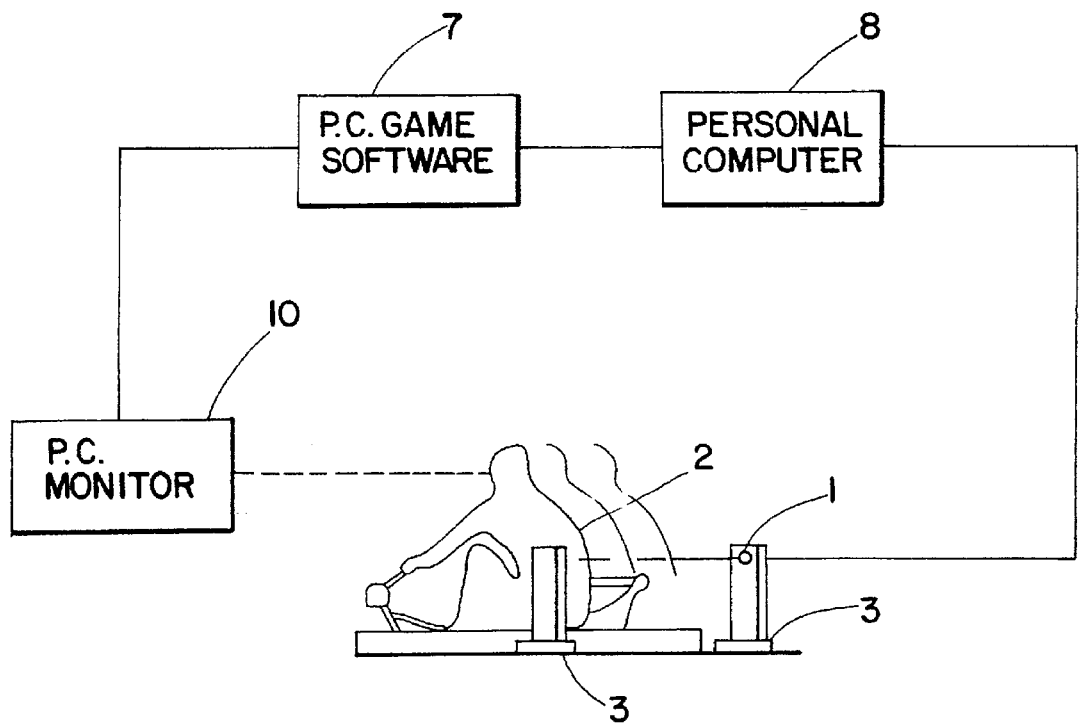
FIG. 3 is a perspective view of a combination of the exercise apparatus sensor positioned on stands, used in connection with an exercise rowing machine. The exercise apparatus is interfacing with a personal computer in order to interact with the exercise apparatus' personal computer game software to control and move objects displayed in the personal computer screen.

The input concerning the amount of physical effort exerted by the exerciser is transmitted to an analog input port on a personal computer 8 (see FIGS. 3 and 4) or to an input jack located on a Nintendo video game computer 9. Once the input information concerning the physical effort reaches the personal computer 8 or the Nintendo video game 9, it will access the exercise apparatus' television game software 6 if a Nintendo video game is being used, or the personal computer game software 7 if a personal computer is being used. The physical effort input information will interact with either the television game software 6 or the personal computer game software 7 to produce visual feedback and entertainment proportional to the exerciser's physical effort (via a game contest) to the exerciser on either a personal computer monitor 10 or a television screen 11 depending on which type of hardware is used.

Both the television game software 6 and the personal computer game software 7 consists of a simulated journey of the exerciser through an environment of competitors using the same exercise equipment or method that exerciser has selected, to encounter obstacles and opportunities for advancement in a gaming metaphor which uses three-dimensional graphics, sound, and trade secret movement sensor algorithms.

The exerciser can also use hand operated micro switches 4—4 mounted in straps 5—5 to send additional input to either the television game software 6 or the personal computer game software 7 to control and interact with objects on the personal computer monitor 10 or the television screen 11. The hand operated micro switches 4—4 mounted in straps can either be hand held or attached to the exercise equipment.

While this invention has been described in its preferred embodiment, it is to be appreciated that variations therefrom may be made without departing from the true scope and spirit of the invention.

What is claimed:

1. An exercising apparatus for exerciser interaction with a video game apparatus during exercise comprising:

a fixed energy source for transmitting energy to a fixed receptor and spaced a sufficient fixed distance from said receptor of said energy to permit various portions of the body of an exerciser, chosen by the exerciser, repetitively to interrupt the energy between said source and said receptor, means for measuring the frequency of interruption of said energy between said energy source and said receiver, means for transmitting said frequency of interruption so measured to computer software, said computer software being so designed so as to provide visual feedback and entertainment to said exerciser from said video game apparatus dependent upon information concerning the frequency of movement of said exerciser so transmitted.

2. The exercising apparatus according to claim 1, comprising in addition thereto:

feedback sensors for interfacing with said exerciser, fixed energy source and fixed receptor, and video game apparatus, and means adapted to interface said feedback sensor signals with said video game apparatus said feedback sensors providing signals for permitting said exerciser interactively to control the subject matter on the video game apparatus display according to said feedback sensor signals.

3. The exercising apparatus according to claim 1 wherein said fixed energy source transmitting energy to a fixed receptor and spaced a sufficient fixed distance from said receptor of said energy to permit various portions of the body of said exerciser, chosen by the exerciser, repetitively to interrupt the energy between said source and said receptor, comprises an optical interrupter circuit including a photoelectric eye and reflector mounted on stands for counting the frequency of movement of said exerciser.

4. The exercising apparatus according to claim 1, wherein said exerciser is provided with the means to select a particular exercise video to be displayed on the video game apparatus during said exercise.

5. The exercising apparatus according to claim 1 wherein said feedback sensors include hand operated microswitches.

6. The exercising apparatus according to claim 2 wherein said feedback sensors interface with said video game apparatus through an analog input port on a computer.

7. The exercising apparatus according to claim 1 wherein said computer software consists of a simulated journey of the exerciser through an environment of competitors, obstacles, and opportunities for advancement in a gaming metaphor which uses three-dimensional graphics, and sound.

\* \* \* \* \*